Oct. 1, 1940.  T. R. HARRISON  2,216,687
MEASURING AND CONTROL INSTRUMENT
Filed Aug. 14, 1936  3 Sheets-Sheet 1

INVENTOR.
THOMAS R. HARRISON
BY George W. [signature]
ATTORNEY

Oct. 1, 1940.  T. R. HARRISON  2,216,687
MEASURING AND CONTROL INSTRUMENT
Filed Aug. 14, 1936   3 Sheets-Sheet 3

INVENTOR.
THOMAS R. HARRISON
BY George W. Munchamp
ATTORNEY.

Patented Oct. 1, 1940

2,216,687

UNITED STATES PATENT OFFICE 2,216,687

MEASURING AND CONTROL INSTRUMENT

Thomas R. Harrison, Wyncote, Pa., assignor to The Brown Instrument Company, Philadelphia, Pa., a corporation of Pennsylvania Application August 14, 1936, Serial No. 96,017

8 Claims. (Cl. 236—44)

My present invention consists in improved apparatus for producing either a measuring effect, a control effect, or both measuring and control effects, in accordance with the product of two variable quantities, and the general object of the invention is to provide apparatus for the purpose which is characterized by its simplicity and effectiveness, and is characterized, in particular, by the avoidance of the lost motion and friction incident to the use of relatively movable co-acting parts in sliding engagement with one another.

A specific object of the present invention is to provide an improved heat meter for measuring the heat transfer from a heating fluid stream to a space or object to be heated. The rate at which heat is so transferred, is proportional to the product of two factors or quantities, namely, the stream velocity or rate of flow, and the difference between the temperatures of the fluid as it respectively passes into and out of heat transfer relation with the space or object heated. My improved meter in its preferred form comprises means responsive to, and directly measuring the flow of the heating fluid, and means separately responsive to, and directly measuring each of said two temperatures, and mechanism upon which each of the said means acts to produce an effect proportional to the rate of heating. Said mechanism in its preferred form comprises an element adapted for angular adjustment by the flow responsive means and the angular position of which is a measure of the rate of flow, a second angularly adjustable measuring element, the angular position of which is a measure of the heating rate, and a special motion transmitting connection between the two elements, through which the first mentioned element acts on the measuring element with a leverage which is varied by adjustments of said connection effected by the two temperature responsive means, on changes in the differential of said temperatures.

The above mentioned two elements are pivoted to turn about stationary axes laterally displaced from one another, and the special motion transmitting connection comprises a member pivoted to one of the elements, a second member pivoted to the other element, and a pivotal connection between the two members, the axes of the three pivotal connections for the two members being laterally displaced from one another and each laterally displaced from, and movable relatively to, the two stationary axes about which the said elements respectively turn.

Another specific object of the present invention is to provide improved apparatus for creating an effect proportional to the relative humidity of an atmosphere. Said apparatus comprises actuating and measuring elements, and a motion transmitting connection between them, such as are included in my improved heat meter, but in the preferred form of the humidity responsive apparatus, the actuating element is adjusted in response to the differential of the wet and dry bulb temperatures of said atmosphere, by means separately responsive to those temperatures, and one of which adjusts the motion transmitting connection, to thereby vary the leverage with which the actuating element actuates the measuring element of the apparatus. In its preferred form, my improved humidity responsive apparatus is adapted not only to measure the relative humidity in enclosed spaces, but to control the supply of moisture to said space, as required to maintain the relative humidity therein at a predetermined value.

Apparatus comprising elements with an adjustable motion transmitting connection between them, as described above, may be used for various purposes, and in my Patent 2,052,764 granted September 1, 1936, on my application therefor, filed June 20, 1930, I have illustrated the use of such mechanism in apparatus for producing an effect proportional to the product of two factors one of which is a measure of the rate of flow of a fluid, such as steam, and the second of which is proportioned to either the steam pressure, or is jointly dependent on the pressure and temperature of the fluid so as to be proportional to the fluid density.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
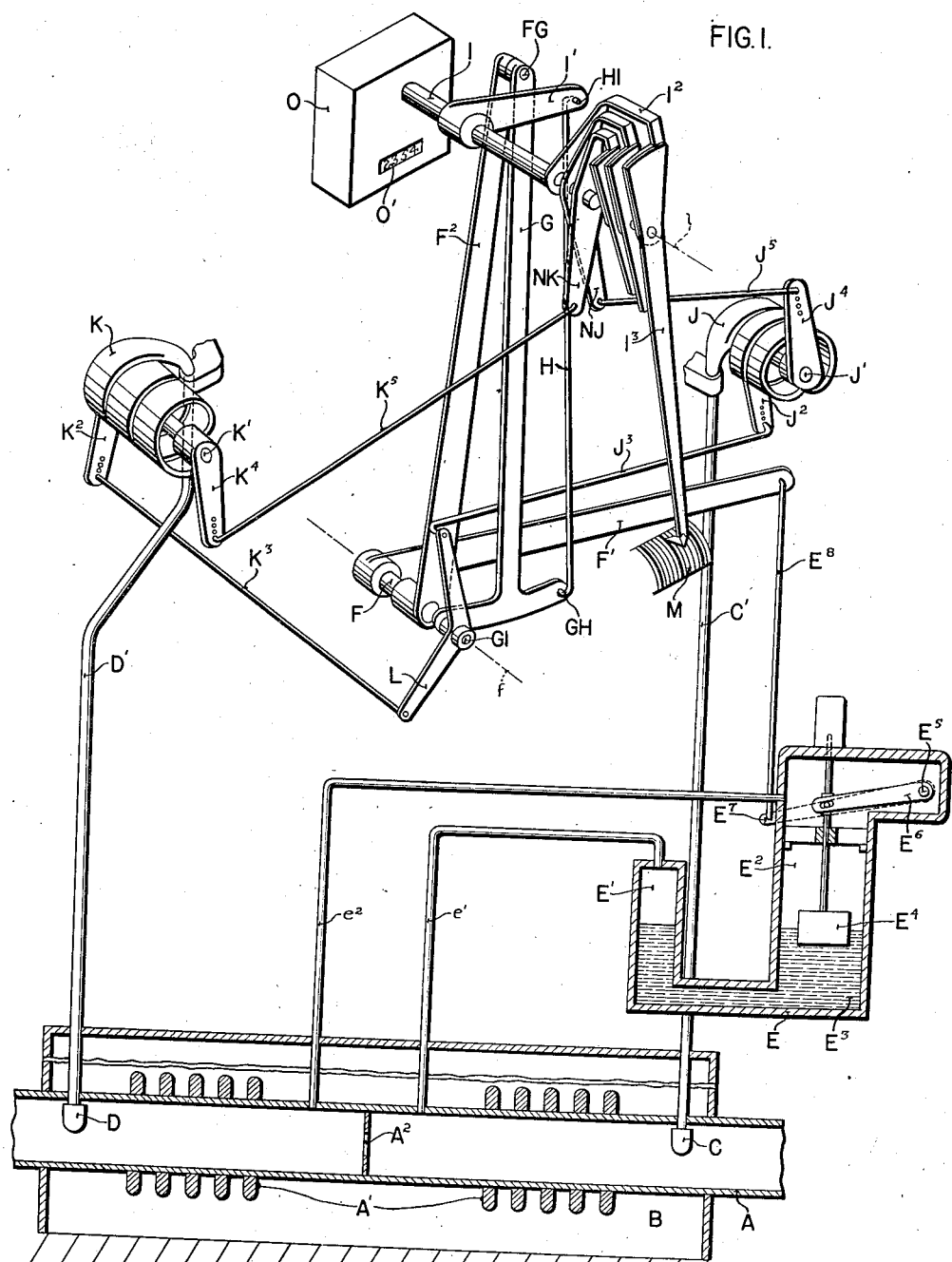
Fig. 1 is a diagrammatic representation of an integrating and recording heat meter.

In the heat meter arrangement shown diagrammatically in Fig. 1, A represents a conduit through which a heating medium, such as steam or hot water, flows in the direction indicated by the arrow, and thereby supplies heat to an enclosed space B through which the conduit A passes. Fins or circumferential ribs $A^1$ on the portion of the conduit A within the space B, are provided to increase the heat transfer into the space B from the fluid within the conduit A. The rate of fluid flow through the conduit A is measured by means including a restricted measuring orifice $A^2$ in the conduit, and the temperature drop of the fluid as it flows through the portion of the conduit in heat transfer relation with the space B, is measured by means of an element C directly responsive to the temperature of the fluid as it comes into heat transfer relation with the space B, and an element D responsive to the temperature of the fluid as it passes out of heat transfer relation with said space.

The flow measuring means associated with the measuring orifice $A^2$ is shown as comprising a U tube manometer E having the upper end of one of its legs E' connected by a pressure transmitting tube $e'$ to the tube A at the inlet side of the measuring orifice $A^2$, and having its other leg $E^2$ connected by a pressure transmitting tube $e^2$ to the conduit A at the delivery side of the orifice $A^2$. Variations in the pressures transmitted through the tubes $e'$ and $e^2$ to the manometer E, displace the sealing liquid $E^3$, ordinarily mercury, therein, and thereby give rising and falling movements to a float $E^4$ resting on the sealing liquid in the leg $E^2$. The rising and falling movements of the float $E^4$ give turning movements to a rock shaft $E^5$ through a pin and slot connection between an arm $E^6$ carried by the shaft, and a stem attached to the float $E^4$. Externally of the manometer shell the shaft $E^5$ carries an arm $E^7$.

The arm $E^7$ is connected by a link $E^8$ to an instrument actuating element F pivoted to turn about a stationary axis $f$. As shown, said element comprises a rock shaft coaxial with the axis $f$, and having two arms F' and $F^2$ rigidly connected thereto. The link $E^8$ is connected to the arm F' at a distance from the axis $f$. The second arm $F^2$ of the element F is connected through a motion transmitting connection comprising members G and H to an instrument element I, which may be called the final measuring element of the apparatus. The element I comprises a rock shaft mounted to turn about its own stationary axis $i$, and an operating arm I' and pen arm $I^2$, each rigidly connected to that shaft. The member G which serves both as a connecting link, and as a lever, is connected by a pivot pin FG to the arm $F^2$ of the actuating element F' for relative movement about the axis of said pivot pin. The last mentioned axis may be called a floating axis, since its position with respect to the stationary axes $f$ and $i$ is varied by angular adjustment of the actuating element F about its axis $f$. The member H is a link having a pivotal connection HI at one end with the arm I' of the measuring element I. The axis of said pivotal connection is laterally displaced from the axis $i$, and may be called a floating axis, as its position relative to the stationary axes $f$ and $i$, varies with changes in the angular position of the measuring element F about its axis $f$ from which it is laterally displaced. The second end of the link member H, is pivotally connected to the member G to turn relative thereto about the axis of their pivotal connection GH. The last mentioned axis is a floating axis in that it is moved relative to the stationary axes $f$ and $i$ as a result of angular movements of the actuating element F, and also as a result of changes in the differential of the temperatures to which the devices C and D are responsive.

As shown, the temperature responsive device C is an expansion thermometer bulb, and is connected by a pressure transmitting tube C' to the stationary end of a spirally wound Bourdon tube J. The movable end of the tube J is connected to a shaft J' which carries the crank arm $J^2$. The temperature responsive device D is a bulb similar to the bulb C, and is connected by a pressure transmitting tube D' to the stationary end of a spirally wound Bourdon tube K having its movable end connected to a rock shaft K' carrying a crank arm $K^2$. The crank arms $J^2$ and $K^2$ are connected by links $J^3$ and $K^3$, respectively, to the opposite ends of a lever L. The latter is pivotally connected midway between its ends to member G by a pivot pin GI.

In the operation of the apparatus shown in Fig. 1, the element F is turned about its axis $f$ by changes in the rate of flow through the conduit A, and the angular position of the element is a measure of the rate of flow through the conduit. On an increase in the rate of flow, raising the sealing liquid level in the manometer leg $E^2$, the float $E^4$ operates through its connection to the arm F' to turn the element F counterclockwise about the axis $f$. On a decrease in the rate of flow, the liquid level in the manometer leg $E^2$ is lowered and the element F is turned clockwise. The pressure in the Bourdon tube J, and consequently the angular position of the crank arm $J^2$, is a measure of the heating fluid supply temperature, to which the bulb C is responsive. On an increase in that temperature, the arm $J^2$ is turned counterclockwise as a result of the unwinding of the Bourdon tube spiral, due to the increase in its internal pressure. Conversely on a reduction in the temperature of the bulb C, the crank arm $J^2$ is turned in clockwise direction. The spirals of the tubes J and K are oppositely wound, and, in consequence, an increase or a decrease in the temperature of the bulb D, produces a clockwise or counter-clockwise turning movement of the crank arm $K^2$.

With the rate of flow and the temperature of the bulk D each constant, the counter-clockwise movement of the arm $J^2$ resulting from an increase in the temperature of the bulb C, will move the upper end of the lever L to the right, as seen in Fig. 1, and thereby bodily adjust the lever G so as to increase the leverage with which the element F acts on element I. That movement of the member G will also produce a simultaneous angular adjustment in the counter-clockwise direction of the element I. Conversely, a decrease in the temperature of the bulb C will effect an adjustment of the element I in the clockwise direction, and will diminish the leverage with which the element F acts on the element I. Similarly, with the rate of flow and the temperature of the bulb C constant, an increase or decrease in the temperature of the bulb D will shift the lower end of the lever L to the left or to the right respectively, and thereby produce the same effect on the position of the pivot GI, member G, and element I, and on the leverage with which the element F acts on the element I as is produced by a decrease or increase, respectively, in the temperature of the bulb C. When the temperatures of the bulbs C and D increase or decrease simultaneously and to the same extent so that the difference between the two temperatures does not vary, the lever L is thereby turned about its pivot GI without shifting the latter and without modifying the position of the element I or the leverage with which the latter is acted upon by the element F. Whenever the difference between the two bulb temperatures increases or decreases, regardless of whether it is due to a change in one, or in the other, or in each of the two temperatures, the leverage with which the element F acts on element I is correspondingly increased or decreased. When the temperature differential increases or decreases simultaneously with a decrease or increase in the rate of flow, however, one change will wholly or partially neutralize the effect of the other on the immediate position of the element I.

As will be apparent from the foregoing, the angular position of the measuring element I will thus be proportional to the product of two factors, one of which is a measure of the rate of fluid flow through the conduit I, and the other of which is a measure of the difference between the temperatures of the bulbs C and D.

Since the pressure drop through the orifice $A^2$ is not proportional to the velocity of the flow through the conduit but to the square of that velocity, the rising and falling movements of the flow $E^4$ will not be in linear proportion to the rate of flow. However, as those skilled in the art will understand, with suitably proportioned and calibrated apparatus of the form shown, the angular position of the element I may be made to vary in approximately constant proportion to the changes in heat transfer rate throughout a substantial range of variation in the rates of flow and in the temperatures to which the bulbs C and D respond.

In the zero-flow condition of the apparatus shown, and with the temperature difference at a value assumed to be a normal or average value in the design of the apparatus, the parts are desirably, although not necessarily, proportioned so that the axis of the pivot GI coincide with the axis $f$, and the axes $f$ and $i$ are at the ends of one long side of a rectangle with the axes of the pivotal connections GH and HI at the opposite ends of the other long side of the rectangle. While the described arrangement is not essential, it is practically desirable that in normal operation, the angle between the plane including the axis GK and the axis of pivot GH, and the plane including the last mentioned axis and the axis of the connection HI, should not vary greatly from a right angle, and this is also true for the angle between the last mentioned plane and the plane including the last mentioned axis and the axis $i$.

As shown, a pen arm $I^3$ connected to the rock shaft of the element I by a bent arm or yoke $I^2$, records on a record chart M, the rate at which the fluid in the conduit A imparts heat to the space B, and the amount of heat so imparted is integrated by a suitable integrating mechanism O controlled by angular position to the rock shaft of the element I. The integrating mechanism O may be of any known or suitable type, and particularly may be of the type disclosed in my previous Patent 1,743,853, granted January 14, 1930, and for that reason, and also because the form of the integrating mechanism constitutes no part of the present invention, said mechanism need not be further illustrated or described herein. As shown, the shaft J' carries an arm $J^4$, which through a link $J^5$, adjusts an arm NJ pivoted on the rock shaft of element I and adapted to record on the chart M the varying values of the temperature of the bulb C. An arm $K^4$ and link $K^5$ similarly actuate an arm NK to record the temperature of the bulb D.

Figure 2:
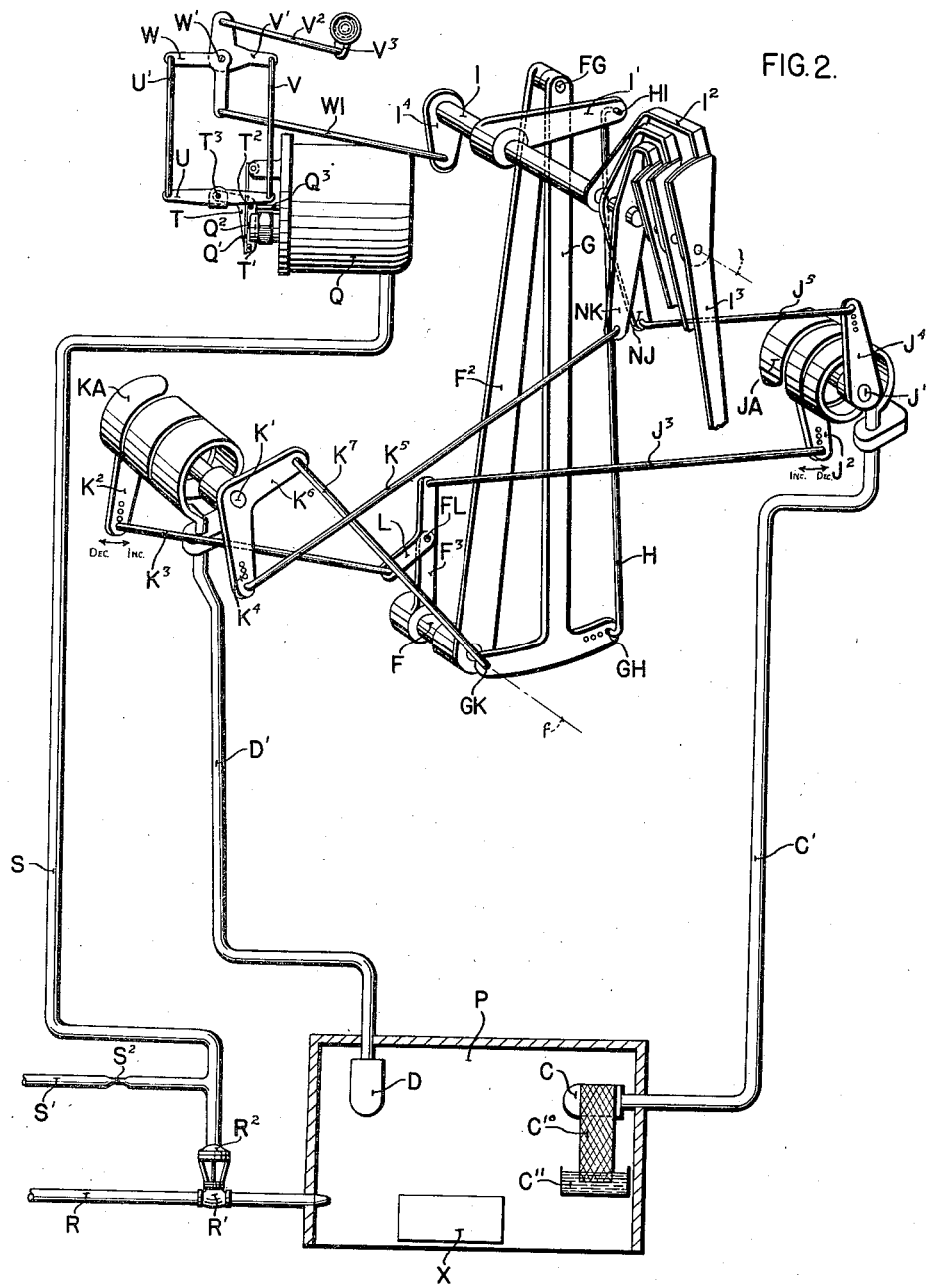
Fig. 2 is a diagrammatic representation of apparatus for measuring and controlling relative humidity.

In Fig. 2, I have illustrated humidity measuring and controlling apparatus comprising a shaft I carrying a pen arm $I^3$, which is given angular movements in accordance with the temperatures of thermometer bulbs C and D, by intervening mechanism generally similar in many respects to that shown in Fig. 1, and including numerous parts like, and designated by the same reference symbols as, corresponding parts previously described. In the apparatus shown in Fig. 2, the thermometer bulbs C and D measure the so-called wet and dry bulb temperatures in a space P, the relative humidity of which is to be measured and controlled. The bulbs C and D of Fig. 2 produce their effects on the angular position of the shaft I through Bourdon tube devices JA and KA, differing from the devices J and K of Fig. 1 in their arrangement and in the connections through which their responses to the corresponding bulb temperature changes effect, or tend to effect, angular adjustments of the shaft I and pen arm $I^3$. The apparatus shown in Fig. 2 also comprises means through which changes in the angular position of the shaft I regulate the operation of control mechanism through which moisture is supplied to the space P at a rate which is varied as a result of changes in the relative humidity in that space.

To make the bulb C of Fig. 2 responsive to the wet bulb temperature in the space P, provisions are made to keep that bulb moist. Those provisions, as conventionally illustrated, comprise a wick $C^{10}$ extending about the bulb C and dipping into a water containing receptacle $C^{11}$. The Bourdon tube device JA is so mounted that its shaft J' turns clockwise or counter-clockwise on an increase or decrease, respectively, in the wet bulb temperature.

The device KA is so arranged that its shaft K' turns counter-clockwise or clockwise on an increase or decrease, respectively, in the dry bulb temperature. In Fig. 2, the member G is angularly adjusted about its pivotal connection FG with the element F, in direct response to changes in dry bulb temperature. To this end, as shown, the shaft K' of the device KA carries an arm $K^6$ connected by a link $K^7$ to the member G, the link being pivotally connected at GK to the member G. As the shaft K' of the device KA turns counter-clockwise or clockwise on an increase or decrease, respectively, in the dry bulb temperature, the member G is turned in the direction tending to give a clockwise or counter-clockwise adjustment, respectively, to the shaft I.

In Fig. 2, the arm $J^2$ and $K^2$ carried by the shafts of the devices JA and KA, are connected by links $J^3$ and $K^3$ to the opposite ends of a floating lever L, as in the construction shown in Fig. 1. In Fig. 2, however, the lever L has a pivotal connection FL intermediate its ends, with an arm $F^3$ carried by the rock shaft F, so that an increase or decrease in the difference between the dry and wet bulb temperatures will give a clockwise or counter-clockwise adjustment, respectively, to the shaft F, and hence will produce, or tend to produce, a clockwise or counter-clockwise adjustment, respectively, of the shaft I. For example, on a decrease or increase in the difference between the wet and dry bulb temperatures, without change in the dry bulb temperature, the shaft I is given a counter-clockwise or clockwise adjustment, respectively, through the lever L on rock shaft F. When the dry and wet bulb temperatures change simultaneously, the shaft I will remain stationary.

Figure 3:
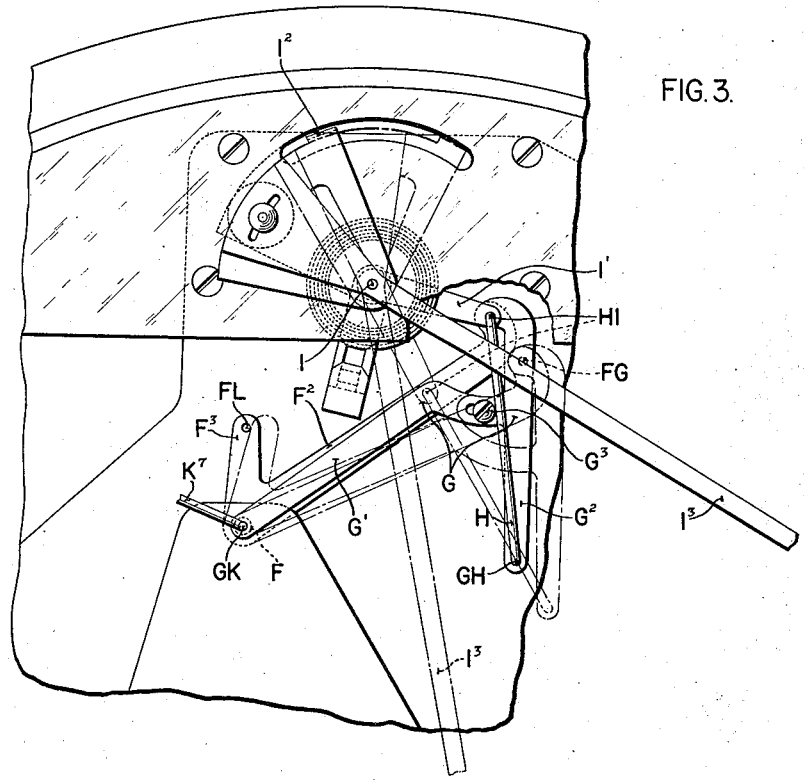
Fig. 3 is an elevation of a portion of the device of Fig. 2.

With the described arrangement, on an increase or decrease in the dry bulb temperature, without change in the difference between the wet and dry bulb temperatures, the shaft I is given a counter-clockwise or clockwise adjustment, respectively, through the member G. To this end the parts are arranged and disposed as shown in Fig. 3 in which the pivots FG and HI coincide at 100% relative humidity and on a decrease in R. H. pivot HI will be turned clockwise about axis $i$ down and away from pivot FG as the latter turns clockwise about axis $f$. On a relative movement of arm G and link H as the distance $f$—GH is lengthened or shortened under the action of link $K^7$ as the dry bulb temperature changes, the link H will be lowered or raised resulting in the motion of shaft $l$ just referred to.

Fig. 3 shows a practical embodiment of the device more or less diagrammatically shown in Fig. 2, but the lever and link arrangements of Figs. 2 and 3 are fundamentally identical. The lever G of Fig. 3 is shown as including two arms $G^1$ and $G^2$ normally rigidly held together by clamping screw $G^3$ but adapted to be relatively adjusted when the clamping screw is manually loosened. In the full line position of Fig. 3 which is the position of 100% humidity, movement of pivot GK toward and away from axis $f$ will not result in movement of arm $l$ because at that time the axes of pivots FG and HI coincide.

When either bulb temperature changes, the relative humidity in the space P will remain practically constant, or will change, accordingly as the other bulb temperature does, or does not, change in a certain definite relation to the changes in the first mentioned bulb temperature. The dry and wet bulb temperature relation for any given relative humidity may be ascertained by reference to standard tables or psychrometric charts.

As is known, a given change in the difference of the wet and dry bulb temperatures at the lower temperatures results from a greater relative humidity change than the same temperature difference change at a higher temperature. For example, a change of temperature difference or wet bulb depression of from 0° F. to 24° F. at 66° F. dry bulb temperature will result from a relative humidity change from 100% to 0% while the same temperature difference change, with a dry bulb temperature of 152°, will result from a relative humidity change from 100% to 50%. In the latter instance the scale span for the same temperature difference change is just one half of the scale span of the former. In the device of Fig. 2 variation in angular motion of the shaft I for a given angular motion of shaft F, depending upon the existing dry bulb temperature is attained by virtue of the relative adjustment of pivot GH and axis $f$ as will be clear. The device may be considered as including a relative humidity measuring element I actuated in response to the difference in wet and dry bulb temperatures through a mechanism including an adjustable lever arm $f$—HI the latter of which is adjusted in length in response to the dry bulb temperature.

The lack of linearity in the variation of relative humidity with temperature difference whether the dry bulb temperature is constant or varies may be substantially compensated for by the arrangement of the levers and links including levers $J^2$ and $K^2$ in respect to their angular working ranges. In this connection it is noted that for a substantial range of bulb temperature variation measured on the Fahrenheit scale, the relative humidity in the space P will be substantially constant, if the product of the dry bulb temperature, multiplied by the reciprocal of the difference between the dry and wet bulb temperatures, is constant. The apparatus shown in Fig. 2 effects such a multiplication, and the angular position of the shaft I, is a measure of said product. A decrease in that product, corresponding to a decrease in relative humidity, results in a clockwise adjustment of the shaft I, while an increase in the product, corresponding to an increase in relative humidity, results in a counter-clockwise adjustment of the shaft I.

The apparatus shown in Fig. 2 comprises exhibiting elements $I^3$, NK and NJ, as in the arrangement shown in Fig. 1, the arm $K^4$ of Fig. 2, operating the arm NK to record the dry bulb temperature, being shown as formed integrally with the arm $K^6$. In Fig. 2, however, the element I is not shown as controlling an integrator, but is provided with a crank arm $I^4$ through which it adjusts a so-called air controller Q of known type, as required to regulate the supply of moisture to the space P, so as to maintain a predetermined relative humidity therein.

The humidity control provisions shown in Fig. 2 are adapted for use under conditions in which moisture must be supplied to the space P, to prevent the relative humidity in the space from diminishing, such as exists, for example, when the space P contains a body X which is to be humidified, or which absorbs water as a result of some chemical reaction. In such case, the amount of moisture necessarily supplied to the space P, and the wet and dry bulb temperatures therein depends on the moisture absorbing action of the body X. As diagrammatically shown in Fig. 2, moisture is supplied to the space P by a steam or water supply pipe R at a rate regulated by the adjustment of a throttling valve R'. The latter is adjusted by a fluid pressure motor $R^2$, in accordance with variations in the value of a controlling air pressure automatically regulated by the controller Q. As diagrammatically shown, a pressure chamber of the regulator Q is connected to the pressure chamber of the motor $R^2$ by a pipe S to which air is supplied from a suitable source of air under pressure through a pipe S' including a restricted orifice $S^2$. The pressure in the pipe S is regulated by adjustment of a flapper Q' to variably throttle flow through a bleeder outlet nozzle $Q^2$ from the pressure chamber of the air controller Q. The flapper Q' is biased for movement toward, and into closing relation, with the outlet nozzle $Q^2$, and is moved in the opposite direction through a flapper operating lever T carrying a flapper engaging pin T'. The lever T is mounted on a fulcrum pivot $T^2$, and is pivotally connected at $T^3$ to a floating lever U. A link V pivotally connected to one end of the lever U forms an adjustable fulcrum for the latter. The lever U is turned about its fulcrum by a link U' connecting the free end of the lever to one arm of a bell crank lever W, which is mounted on a stationary fulcrum pivot W', and has a second arm connected by a link WI to the arm $I^4$. The link V is shown as suspended from one arm of a bell crank lever V' pivoted on the pivot pin W' and having a second arm connected by link V² to a crank arm extension from a part V³ which may be angularly adjusted manually, and which by its adjustment determines the relative humidity in the space P which the apparatus tends to maintain.

For the general purposes of the present invention, the fulcrum pivot T² for the flapper actuating lever T might be stationary, but in the commercial form of the air controller Q illustrated, the fulcrum pivot T² is adjusted in the direction of the axis of the controller Q, by a member Q3 connected to mechanism within the controller and given predetermined movements by predetermined changes in the control pressure. The last mentioned mechanism need not be illustrated and described herein, however, since it is already known and in commercial use. The particular type and form of air controller shown, which constitutes no part of my present invention, embodies features of construction and arrangement disclosed and claimed in my prior application, Ser. No. 40,103, filed September 11, 1935, and in Patent 2,124,946 granted July 26, 1938, on the joint application of Frederick W. Side and myself, filed October 12, 1933.

Space P of Fig. 2 in practice could well be a conditioning chamber into which the body X is placed to restore the moisture in that body to a predetermined degree following a drying operation performed on the body. It is common practice in the textile industry, for example, to overdry fabrics, hosiery and the like, and later humidify the materials to a predetermined degree. This method of overdrying and humidifying is inefficient as is well recognized and in Fig. 4 I show means whereby the device of Fig. 2 may be adapted to the drying operation to control the latter for the purpose of drying the material only to the desired extent and thereby dispense with the subsequent humidifying or conditioning operation.

Figure 4:
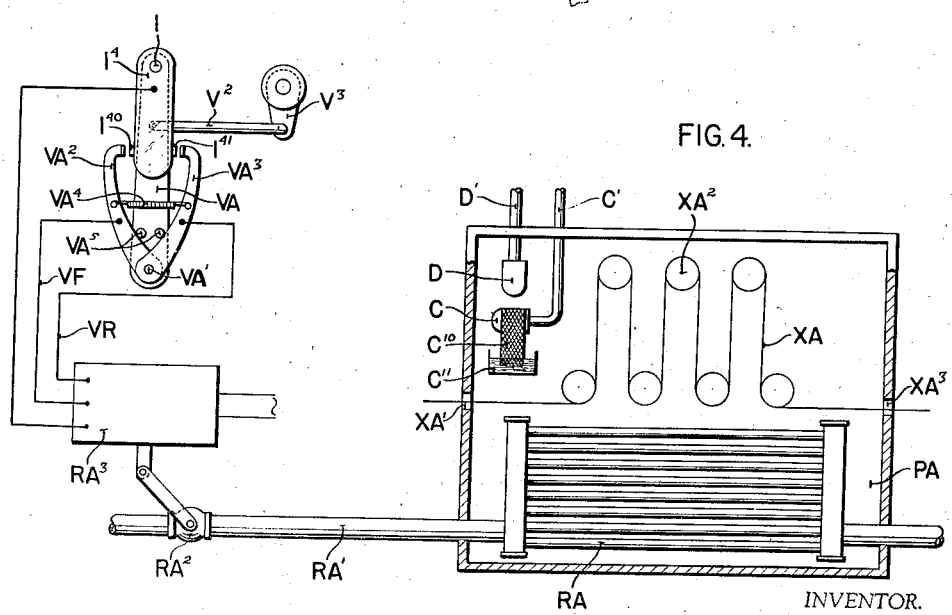
Fig. 4 is a modification of a portion of the device of Fig. 2.

As shown, Fig. 4 includes a drying chamber PA in which material XA to be dried and conditioned is subjected to a drying atmosphere. The material XA may enter the drying chamber at XA¹ passing over rollers XA² and leaving the chamber at XA³. The atmosphere may be controlled by any suitable means as by means of a heating coil RA supplied with steam or other heating medium through the conduit RA¹, the latter of which is controlled by the valve RA². Valve RA² may be controlled by a motor mechanism of well known construction as indicated at RA³ and the motor mechanism may be controlled by an electrical contact device cooperating with a lever I⁴ corresponding to the similarly designated lever of Fig. 2. The contacting mechanism includes a carriage VA carrying the pin VA¹ on which are mounted the contact levers VA² and VA³. Levers VA² and VA³ are adapted to be engaged respectively by contacts I⁴⁰ and I⁴¹ of member I⁴ when the latter is moved whereby one or the other of a pair of reversing fields or the like of the mechanism RA³ may be selectively energized over conductors VF or VR to operate the valve mechanism and increase or decrease the supply of heating or drying medium to the chamber PA in response to an increase or decrease respectively in the relative humidity of the chamber atmosphere. The motor mechanism is not described in detail, being of any suitable form well known in the art. Carriage VA is mounted coaxially with the shaft I but may rotate independently of the latter and is adjustable about that axis by means of the member V³ and link V² but is adapted to be held in any position to which it is adjusted. The contact arms VA² and VA³ are urged toward one another by means of a spring VA⁴ into contact with stops VA⁵ mounted on carriage VA. It will be clear that upon rotation of the member I⁴ with shaft I one or the other of contact arms VA² and VA³ will be engaged in accordance with the direction of the deflection of the member but the movement of the member will not be prevented because of the resiliency of the spring VA⁴ which will permit either contact to move with the member when contacted. While electrical control provisions have been illustrated in Fig. 4 it will be understood that air control means such as shown in Fig. 2 may be used to adjust valve RA².

As will be apparent, Figs. 1 and 2 illustrate specifically different embodiments of apparatus having the common generic characteristic of multiplying a quantity, which is a function of the difference between two related temperatures by a second quantity which is related to the first quantity.

In Fig. 1, the heat change in the heat content of a heating agent stream occurring between spaced apart points in the path of flow of said stream, is jointly dependent upon, the difference between the stream temperatures at said points, and upon the stream velocity, and in Fig. 2 the relative humidity in a space is jointly dependent upon the dry bulb temperature, and upon the difference between the wet and dry bulb temperatures in the space.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Apparatus for multiplying a quantity proportional to the difference between two temperatures, and a related quantity, comprising in combination, a floating lever, means for giving movement to one end of said lever in accordance with changes in one of said temperatures, means for giving movement to the other end of said lever in accordance with changes in the other of said temperatures, an actuating element adjustable about a stationary axis, a device adjustable about a second stationary axis laterally displaced from the first mentioned axis, a jointed motion transmitting element through which an adjustment of the first mentioned element effects an adjustment of said device and which is adjustable to vary the ratio of said adjustments, said floating lever being pivotally connected intermediate its ends to one of said elements and forming an adjusting means therefor, and means responsive to changes in said related quantity acting on, and adjusting the other of said elements.

2. Apparatus for measuring relative humidity, comprising in combination a floating lever, dry bulb temperature responsive means connected to, and giving movement to one end of said lever in accordance with changes in dry bulb temperature, wet bulb temperature responsive means connected to and giving movement to the other end of said lever in accordance with changes in wet bulb temperature, an element adjustable about a stationary axis to which said lever is pivotally connected intermediate its ends at a distance from said axis, a device angularly adjustable about a second stationary axis laterally displaced from the first mentioned axis, a jointed motion transmitting connection between said element and said device, and means actuated by changes in dry bulb temperature for adjusting said connection to thereby vary the angular adjustment of said device effected by change in angular adjustment of said element.

3. Apparatus for controlling the relative humidity in a space, comprising in combination, a valve adapted to control the humidity of said space, a pivoted lever and means responsive to wet bulb temperature changes in said space and adapted to angularly adjust said lever in accordance with said changes, a second pivoted lever and means responsive to to dry bulb temperature changes in said space and adapted to angularly adjust said second lever in accordance with the last mentioned changes, controlling means for said valve, a pivoted member cooperating with said means to control said valve, a lever and link mechanism connecting said levers and member and including a final member operating element, a connection between said levers and said element, and a second connection between said second lever and said element, whereby said member is moved in response to the movement of said lever modified by the difference in movements of the two levers, each of said connections consisting of lever and link elements.

4. The combination of claim 3 in which said lever and link mechanism, said levers and said member are movable only in parallel planes.

5. The combination of claim 3 in which said lever and link mechanism, said levers and said member are movable only in parallel planes and all the elements of which are restricted to rotative movement.

6. Apparatus for controlling the relative humidity in a space, comprising in combination, a valve adapted to control the humidity of said space, a pivoted lever and means responsive to wet bulb temperature changes in said space and adapted to angularly adjust said lever in accordance with said changes, a second pivoted lever and means responsive to dry bulb temperature changes in said space and adapted to angularly adjust said second lever in accordance with the last mentioned changes, a control member, a pivoted member cooperating with the first mentioned member to control the said valve, a lever and link mechanism connecting said levers and second mentioned member and including a final member operating element, a connection between said levers and element, and a second connection between said second lever and element, whereby said second mentioned member is moved in response to the movements of said second lever modified by the difference in movements of the two levers, each of said connections consisting of lever and link elements.

7. Apparatus for controlling the relative humidity in a space, comprising in combination, a pressure responsive valve adapted to control the humidity of said space, a pivoted lever and means responsive to wet bulb temperature changes in said space and adapted to angularly adjust said lever in accordance with said changes, a second pivoted lever and means responsive to dry bulb temperature changes in said space and adapted to angularly adjust said second lever in accordance with the last mentioned changes, a nozzle adapted to be connected to a source of pressure supply and to said valve, a pivoted closure member cooperating with said nozzle to control the pressure on said valve, and lever and link mechanism connecting said levers and member and including a final member operating element, a connection between said levers and said element, and a second connection between said second lever and said element, whereby said member is moved in response to the movement of said second lever modified by the difference in movements of the two levers, each of said connections consisting of lever and link elements.

8. Apparatus for multiplying a factor proportional to the algebraic sum of two temperatures and a factor proportional to one of said temperatures comprising a final deflecting element pivoted to rotate about an axis, a lever bodily adjustable about a second axis and adapted to actuate said element through means connected to said element and to a pivot on said lever, means responsive to the difference of said temperatures and connected to said lever to move the latter bodily about said second axis substantially proportionally to the variations in said temperature difference, and means responsive to one of said temperatures to move said pivot toward and away from said second axis in substantial proportionality to the variations in said one temperature.

THOMAS R. HARRISON.